United States Patent [19]

Zimmerman

[11] Patent Number: 5,593,260

[45] Date of Patent: Jan. 14, 1997

[54] APPARATUS FOR SECURING A VEHICLE TO A TRAILER

[76] Inventor: Casey Zimmerman, 22818 Xenon St. NW., Elk River, Minn. 55330

[21] Appl. No.: 405,742

[22] Filed: Mar. 20, 1995

[51] Int. Cl.⁶ .................................................. B60P 3/075
[52] U.S. Cl. .............................. 410/20; 410/30; 414/563
[58] Field of Search ................................. 414/563, 426; 280/406; 410/3, 16, 19, 20, 21, 30

[56] References Cited

U.S. PATENT DOCUMENTS

| | | | |
|---|---|---|---|
| 1,424,957 | 8/1922 | Van Tilburg | 410/21 |
| 4,190,262 | 2/1980 | Johansson | 410/37 |
| 4,227,633 | 10/1980 | Sellberg | 410/19 |
| 4,257,644 | 3/1981 | Stephens | 296/65 R |
| 4,592,564 | 6/1986 | Warnock et al. | 280/402 |
| 4,635,835 | 1/1987 | Cole | 224/42.08 |
| 4,761,015 | 8/1988 | Carr | 414/563 |
| 4,792,268 | 12/1988 | Smith | 410/9 |
| 4,799,711 | 1/1989 | Moore | 280/444 |
| 4,840,534 | 6/1989 | Totty | 414/563 |
| 4,846,610 | 7/1989 | Schoenleben | 410/96 |
| 4,852,779 | 8/1989 | Berg | 410/3 |
| 4,874,284 | 10/1989 | New, Jr. | 414/537 |
| 4,954,030 | 9/1990 | Szucs et al. | 410/96 |
| 4,964,771 | 10/1990 | Callihan | 410/118 |
| 4,968,052 | 11/1990 | Alm et al. | 414/563 |
| 5,016,896 | 5/1991 | Shafer | 280/400 |
| 5,016,897 | 5/1991 | Kauffman | 280/402 |
| 5,222,753 | 6/1983 | Parish | 280/400 |
| 5,259,720 | 11/1993 | Lobner | 414/483 |
| 5,314,200 | 5/1994 | Phillips | 280/400 |

FOREIGN PATENT DOCUMENTS 1364511  1/1988  U.S.S.R. ............................... 410/19

*Primary Examiner*—David A. Bucci
*Assistant Examiner*—Gregory A. Morse
*Attorney, Agent, or Firm*—Kinney & Lange, P. A.

[57] ABSTRACT

An apparatus for securing a vehicle, such as an all-terrain vehicle, to a trailer of the type towed by a car or truck is disclosed. The apparatus includes a cylindrical sleeve capable of being fastened to the trailer. First and second wheel stop bars are connected substantially perpendicular to the cylindrical sleeve. A lift bar has a body, a first arm, a first finger, a second arm and a second finger. The body of the lift bar is positioned substantially within the cylindrical sleeve for rotational movement about an axis within the cylindrical sleeve. A first chain is connected to the first finger of the lift bar and connected to the first wheel stop bar for securing a first wheel of the vehicle to the trailer. A first chain is connected to the second finger of the lift bar and connected to the second wheel stop bar. With the apparatus properly applied, the vehicle can be securely transported on the trailer.

13 Claims, 5 Drawing Sheets

APPARATUS FOR SECURING A VEHICLE TO A TRAILER

BACKGROUND OF THE INVENTION

The present invention relates to an apparatus for securing a vehicle having at least one wheel to a trailer which can be towed by a car or truck. In particular, the present invention relates to an apparatus which can secure an all-terrain vehicle to a trailer for transporting the all-terrain vehicle from one location to another.

Traditionally, vehicles such as snowmobiles have been transported from one location to another via flat-bed trailers. A flat-bed trailer is a trailer having a bed welded to its frame. Through use of a securing bar and a tommy screw or bolt, one or two snowmobiles can be secured to the flat-bed trailer.

More particularly, one or two snowmobiles are driven onto the flat-bed trailer via a ramp or by having the flat-bed trailer tilt to the ground. Once the snowmobiles are properly positioned on the flat-bed trailer and the flat-bed trailer had resumed its horizontal position, a securing bar would be placed on top of the skis of the snowmobiles. The securing bar is then secured to the flat-bed trailer via a tommy screw or bolt. Due to the configuration of the skis of the snowmobiles, the snowmobiles are then secured for transporting from one location to another.

Recently, the same flat-bed trailers have been used to transport all-terrain vehicles (ATVs) from one location to another. However, the securing bar used to secure the snowmobiles to the flat-bed trailer are no longer functional for their intended purpose with respect to ATVs. Therefore, ATV users have been utilizing tie-down straps made from bungee cords or nylon ropes to secure the ATV to the flat-bed trailer. Normally, a number of tie-down straps are fastened to an axle of the ATV and also fastened to the frame of the flat-bed trailer.

Due to the material of the tie-down straps and due to the awkward positioning of the tiedown straps with respect to the ATV and the flat-bed trailer, it is possible for the ATV to become unsecured. In particular, ATVs often bounce up and down on the flat-bed trailer during transportation. In some extreme circumstances, the tie-down straps have become unfastened to either the ATV or to the flat-bed trailer and the ATV has fallen off the flat-bed trailer during transportation; thereby providing a significant hazard and danger to passengers in other vehicles.

Thus, there is a need for an apparatus which can securely fasten an ATV to a flat-bed trailer during transportation of the ATV from one location to another. The apparatus must secure the apparatus during transportation to prevent an ATV from falling off the flat-bed trailer. Also, the apparatus should secure the ATV to a flat-bed trailer such that the ATV cannot be easily removed from the flat-bed trailer unless desired.

SUMMARY OF THE INVENTION

The present invention is an apparatus for securing a vehicle having at least one wheel to a trailer. The apparatus includes a cylindrical sleeve member capable of being fastened to the trailer. In one embodiment, the cylindrical sleeve member has an inner diameter of at least 0.20 inches. A first wheel stop bar is connected substantially perpendicular to the cylindrical sleeve member. The first wheel stop bar is an indicator to the driver of the vehicle that he may stop the vehicle once the tire comes in contact with the first wheel stop bar. A lift bar has a body, a first arm and a first finger. The body of the lift bar is positioned substantially within the cylindrical sleeve member for rotational movement about an axis within the cylindrical sleeve member. In one embodiment, the body of the lift bar has an outer diameter of at least 0.20 inches. This minimum diameter is necessary to provide an adequate amount of rigidness and support to the apparatus. First securing means connects the first finger of the lift bar to the first wheel stop bar.

The apparatus further includes a second wheel stop bar connected substantially perpendicular to the cylindrical sleeve member. Also, the lift bar further includes a second arm and a second finger. Second securing means connects the second finger of the lift bar to the second wheel stop bar. While in the secured position, the combination of the first and second arms preventing lateral movement and the securing means preventing other movement ensures that a vehicle such as an ATV is secured to the trailer.

In one preferred embodiment, the first and second securing means each comprise a chain having a first and a second end. Connecting means are positioned at the first end of each chain for connecting the chains to the first and second fingers, respectively. Additional connecting means are positioned at the second end of the chains for connecting the chains to the first wheel stop bar and the second wheel stop bar, respectively.

In one preferred embodiment, locking means are provided for locking the first and second securing means to the first and second fingers of the lift bar, respectively and for locking the first and second securing means to the first and second wheel stop bars, respectively.

In one preferred embodiment, the first and second arms encompass a single wheel and the first and second securing means connect the first and second fingers to a single wheel stop bar. This embodiment secures a single wheel to the trailer, such as in the case of the front end of a three wheel ATV.

DETAILED DESCRIPTION OF THE PREFERRED EMBODIMENTS

Figure 1:
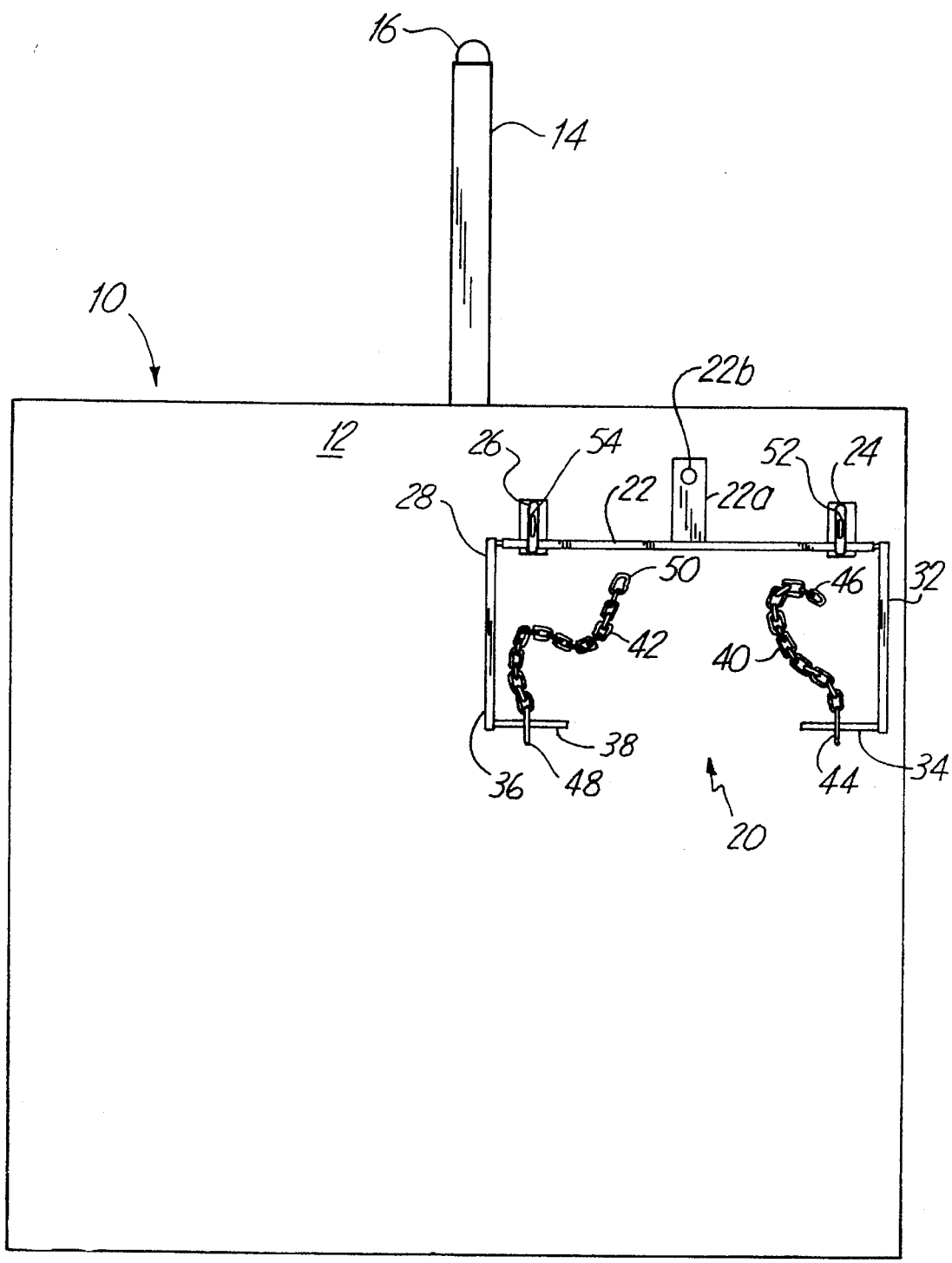
FIG. 1 is a top view of a flat-bed trailer showing the present invention.

The present invention is an apparatus which can secure an all-terrain vehicle (ATV) to a trailer for transporting the ATV from one location to another. FIG. 1 shows the present invention positioned on flat-bed trailer 10 which includes flat-bed 12, arm 14 and hitch 16. Flat-bed trailer 10 can be secured to a car or truck via arm 14 and hitch 16.

As shown in FIGS. 1–4, ATV securing mechanism 20 includes cylindrical sleeve 22 having plate 22a and hole 22b, first wheel stop bar 24, second wheel stop bar 26, lift bar 28 having body 30, first arm 32, first finger 34, second arm 36, second finger 38, chain 40 having end links 44 and 46, chain 42 having end links 48 and 50, and loops 52 and 54.

Figure 2:
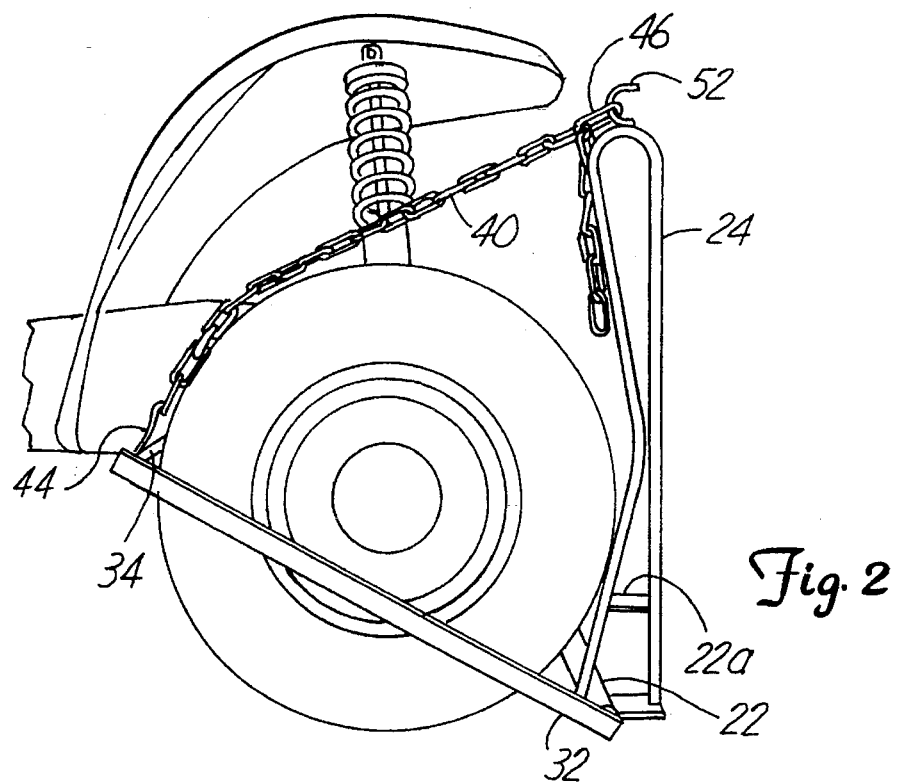
FIG. 2 is a side view of a portion of the present invention connected to a wheel of an all-terrain vehicle.
Figure 3:
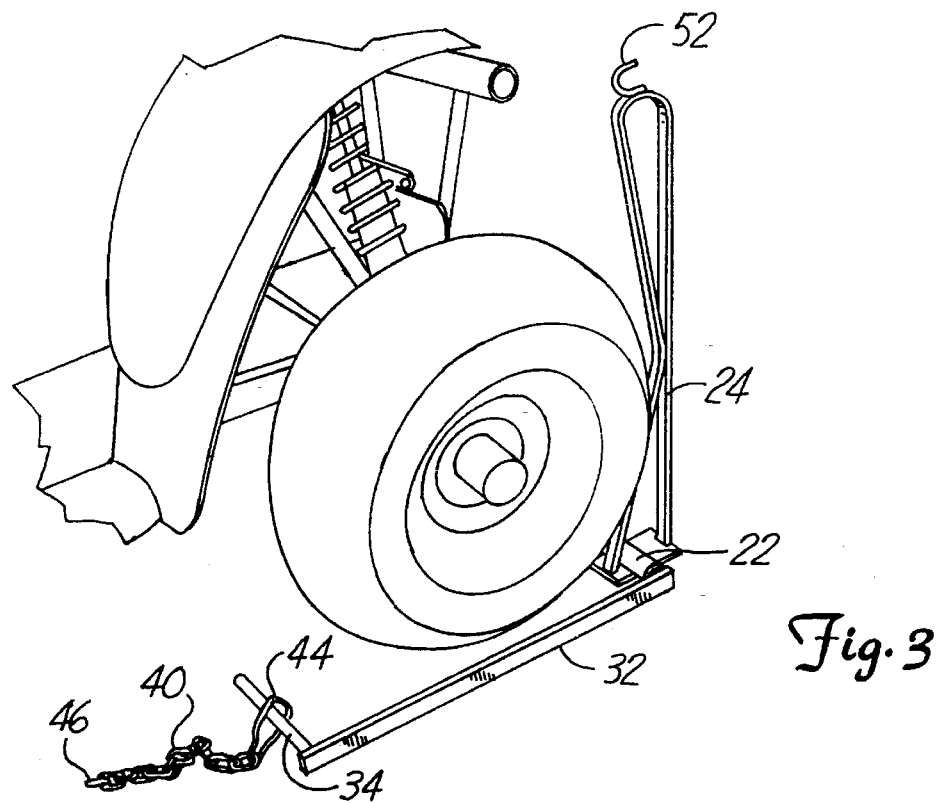
FIG. 3 is a perspective view of a portion of the present invention prior to connection to a wheel of an all-terrain vehicle.

In operation, securing mechanism 20 is secured to flat-bed 12 of flat-bed trailer 10 via a tommy screw or bolt (not shown). An ATV is positioned onto flat-bed 12 of flat-bed trailer 10 via ramps (not shown) or by having flat-bed trailer 10 tilt to the ground to allow the ATV to be driven onto it. The ATV can be driven onto flat-bed trailer 10 until the front wheels of the ATV come in contact with first and second wheel stop bars 24 and 26 and flat-bed 12 resumes its horizontal position. FIGS. 2 and 3 show one wheel coming in contact with first wheel stop bar 24. Once the ATV is properly positioned with the front tires touching first and second wheel stop bars 24 an 26, ATV securing mechanism 20 can properly secure the ATV to flat-bed trailer 10.

FIGS. 2 and 3 show a side view and a perspective view, respectively, of one half of the present invention with an ATV properly positioned on flat-bed trailer 10. FIGS. 2 and 3 only show one half of ATV securing mechanism 20. However, it is understood that the left half of ATV securing mechanism 20 (not shown) is identical to the right half of ATV securing mechanism 20 shown in FIGS. 2 and 3.

With the ATV properly positioned on flat-bed trailer 10 as shown in FIGS. 2 and 3, lift bar 28 is pivoted about a longitudinal axis within the center of body 30 of lift bar 28. Thus, first arm 32 and first finger 34 can be rotated upwards from the position shown in FIG. 3 until first finger 34 comes in contact with the wheel of the ATV as shown in FIG. 2. Chain 40 can then be secured to loop 52 via end link 46 or any other loop of chain 40 such that the ATV is secure. With ATV securing mechanism 20 connected as shown in FIG. 2, and with the understanding that the left half of ATV securing mechanism 20 would connected in a similar manner, the ATV is secured to flat-bed trailer 10 and is ready to be transported. First arm 32 and second arm 36 prevent lateral movement of the ATV, while chains 40 and 42 prevent other movement.

Figure 4:
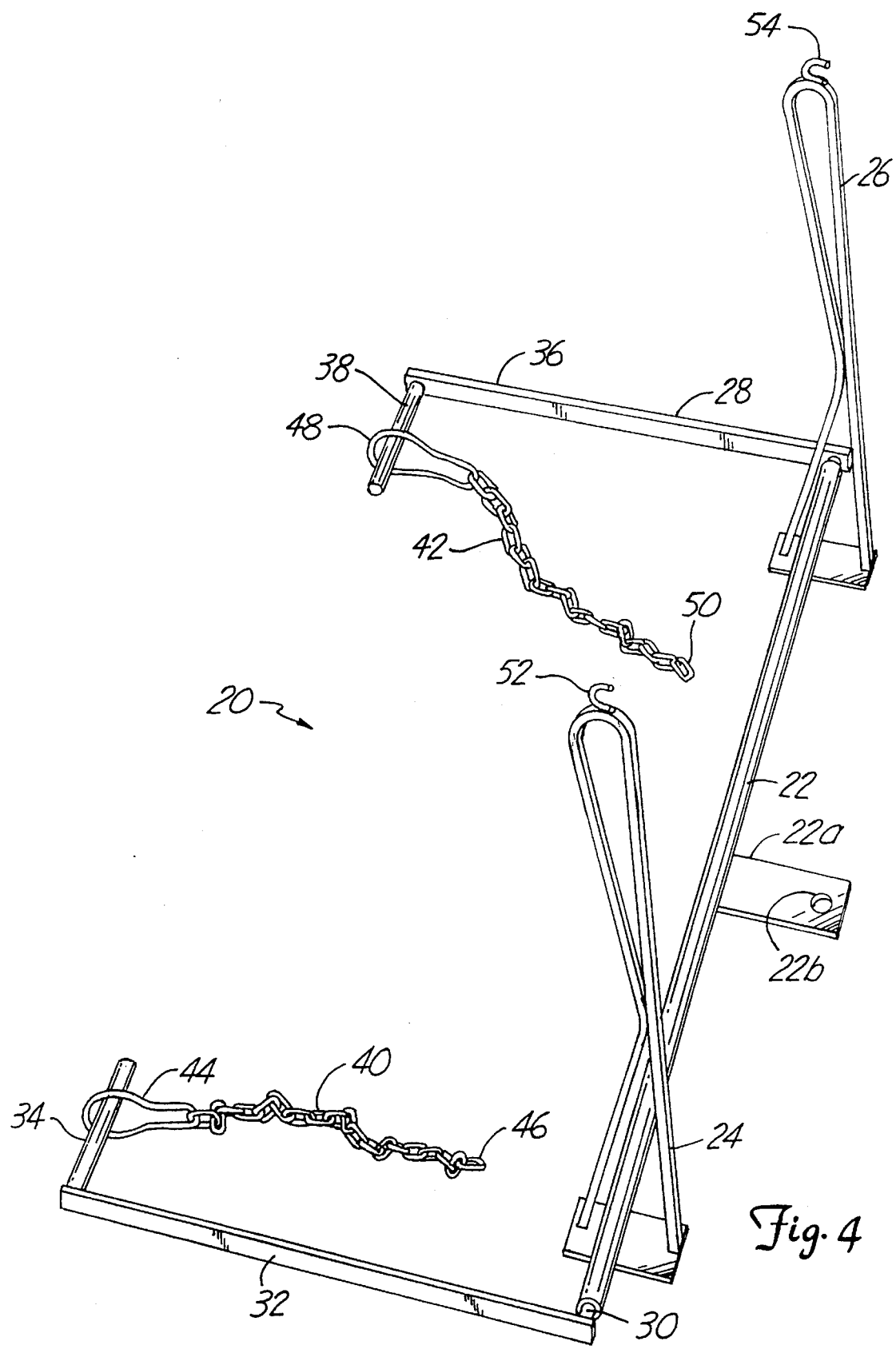
FIG. 4 is a perspective view of the present invention.

FIG. 4 is a perspective view of ATV securing mechanism 20. As shown in FIG. 4, cylindrical sleeve 22 includes plate 22a having hole 22b. Hole 22b allows ATV securing mechanism 20 to be rigid secured to flat-bed 12 of flat-bed trailer 10 via a tommy screw or bolt (not shown). FIG. 4 also clearly shows body 30 of lift bar 28 encompassed by cylindrical sleeve 22. In one preferred embodiment, cylindrical sleeve 22 has an inner diameter of at least 0.20 inches and body 30 of lift bar 28 has an outer diameter of at least 0.20 inches. These minimum diameters are necessary in order for the materials making up ATV securing mechanism 20 to be rigid and strong enough to properly secure an ATV to flat-bed trailer 10. It is understood that other components of securing mechanism 20 may be made of any material and be of any dimension as long as the components will provide the rigidness and support necessary to secure an ATV to trailer 10.

Figure 5:
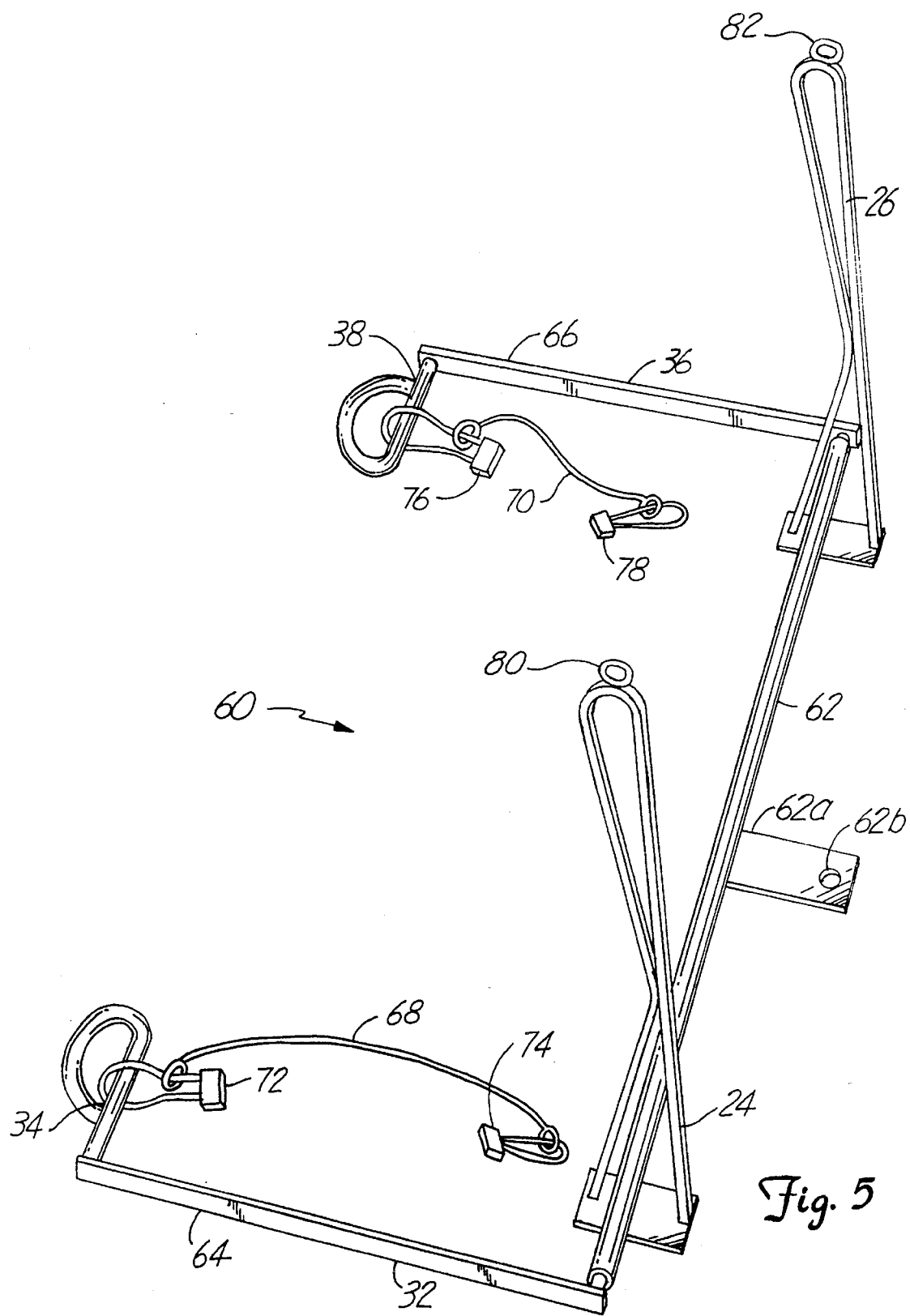
FIG. 5 is a perspective view of an alternate embodiment of the present invention.

FIG. 5 is a perspective view of an alternate embodiment of the present invention. Several features of the alternate embodiment shown in FIG. 5 are similar to the features shown in the embodiment shown in FIG. 4. Therefore, these similar elements have been labeled with the same numerals.

As shown in FIG. 5, ATV securing mechanism 60 includes stationary bar 62 having plate 62a and hole 62b, first lift bar 64 having first arm 32 and first finger 34, second lift bar 66 having second arm 36 and second finger 38, first and second tiedown straps 68 and 70 having locks 72, 74, 76 and 78, and first and second wheel stop bars 24 and 26 having loops 80 and 82.

The embodiment shown in FIG. 5 is utilized similar to the embodiment shown in FIGS. 1–4. ATV securing mechanism 60 is secured to a flat-bed trailer via positioning a tommy screw or bolt through hole 62b of plate 62a. An ATV is positioned on the flat-bed trailer with its front tires touching first and second wheel stop bars 24 and 26. First and second arms 32 and 36 are pivotally connected to stationary bar 62 such that first and second arms 32 and 36 can rotate with respect to bar 62. Bar 62 remains stationary and does not rotate.

Once the ATV is properly positioned with respect to ATV securing mechanism 60, first and second arms 32 and 36 can be rotated until first and second fingers 34 and 38 come in contact with the tires of the ATV. Locks 72, 74, 76 and 78 can then be properly secured to first and second fingers 34 and 38 and loops 52 and 54. Locks 72, 74, 76 and 78 prevent an ATV from being removed from a flat-bed trailer unless desired (i.e. theft prevention). Tie-down straps 68 and 70, which can be made from any type of nylon cord or bungee cord, prevent movement of the ATV.

Figure 6:
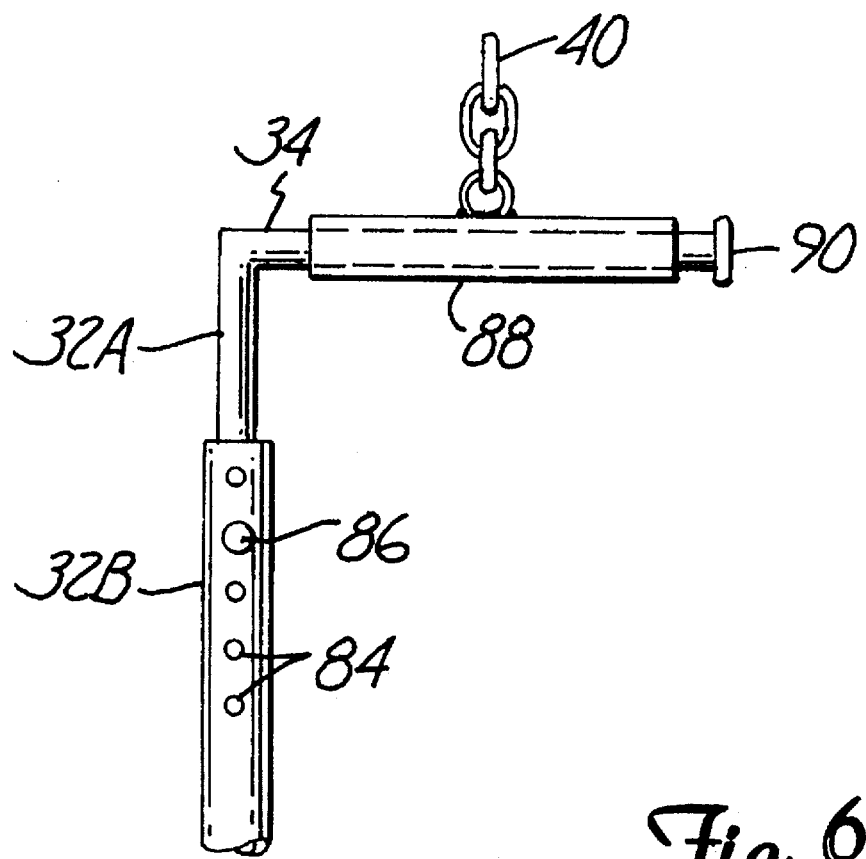
FIG. 6 is an enlarged view of a portion of the present invention showing a second alternate embodiment.

FIG. 6 is an enlarged view of a portion of the present invention showing a second alternate embodiment. As shown in FIG. 6, first arm 32 consists of first portion 32a and second portion 32b. First portion 32a is configured so that it can fit inside of second portion 32b. Through use of holes 84 and pin 86, the length of first arm 32 can be adjusted such that it will allow adaptability to different tire sizes.

Sleeve 88 has been mounted to finger 34 such that sleeve 88 can move about finger 34 between arm 32 and end cap 90. Chain 40 has been secured to sleeve 88 by a spot weld or other fastening means. The configuration shown in FIG. 6 will keep chain 40 centered on the tire of the vehicle being secured to the trailer and will prevent chain 40 from coming off the side of the tire. It is understood that similar configuration could be used for second arm 36 and second finger 38.

The present invention shown and described herein secures a vehicle having at least one wheel to a trailer which can be towed by a car or truck. While the drawings show an ATV, it is understood that the present invention can secure any type of vehicle which has at least one wheel, such as a lawn mower or a snow-blower. In addition, it is understood that the present invention can secure a single wheel of a vehicle, rather than securing two wheels of a vehicle. This can be done by having a shorter body 30 of lift bar 28, (embodiment shown in FIGS. 1–4) or a shorter stationary bar 62 (embodiment shown in FIG. 5). Thus, first arm 32 and second arm 36 would prevent lateral movement of a single wheel. This type of arrangement is utilized when securing the front end of a three wheel ATV to trailer 10.

Although the present invention has been described with reference to preferred embodiments, workers skilled in the art will recognize that changes may be made in form and detail without departing from the spirit and scope of the invention.

What is claimed is:

1. An apparatus for securing a vehicle to a trailer, the apparatus comprising:

a cylindrical sleeve member capable of being fastened to the trailer;

a first wheel stop bar connected substantially perpendicular to the cylindrical sleeve member;

a second wheel stop bar connected substantially perpendicular to the cylindrical sleeve member;

a lift bar having a body, a first arm, a first finger, a second arm and second finger, the body positioned substantially within the cylindrical sleeve member for rotational movement about an axis within the cylindrical sleeve member;

first securing means connected to the first finger of the lift bar and connected to the first wheel stop bar for securing a first wheel of the vehicle to the trailer, wherein the first arm prevents lateral movement of the vehicle in a first direction; and second securing means connected to the second finger of the lift bar and connected to the second wheel stop bar for securing a second wheel of the vehicle to the trailer, wherein the second arm prevents lateral movement of the vehicle in a second direction, opposite of the first direction.

2. The apparatus of claim 1 wherein the first securing means further comprises:

a first chain having a first end and a second end;

first connecting means positioned at the first end of the first chain for connecting the first chain to the first finger; and second connecting means positioned at the second end of the first chain for connecting the first chain to the first wheel stop bar.

3. The apparatus of claim 2 wherein the second securing means further comprises:

a second chain having a first end and a second end;

first connecting means positioned at the first end of the second chain for connecting the second chain to the first finger; and second connecting means positioned at the second end of the second chain for connecting the second chain to the first wheel stop bar.

4. The apparatus of claim 1 wherein the first securing means further comprises:

a first rope having a first end and a second end;

first connecting means positioned at the first end of the first rope for connecting the first rope to the first finger; and second connecting means positioned at the second end of the first rope for connecting the first rope to the first wheel stop bar.

5. The apparatus of claim 4 wherein the second securing means further comprises:

a second rope having a first end and a second end;

first connecting means positioned at the first end of the second rope for connecting the second rope to the first finger; and second connecting means positioned at the second end of the second rope for connecting the second rope to the first wheel stop bar.

6. The apparatus of claim 1 and further comprising:

first locking means for locking the first securing means to the first finger of the lift bar and for locking the securing means to the first wheel stop bar.

7. The apparatus of claim 6 and further comprises:

second locking means for locking the second securing means to the second finger of the lift bar and for locking the second securing means to the second wheel stop bar.

8. The apparatus of claim 1 wherein the cylindrical sleeve member has an inner diameter of at least 0.20 inches.

9. The apparatus of claim 1 wherein the body of the lift bar has an outer diameter of at least 0.20 inches.

10. An apparatus for securing a vehicle to a trailer, the apparatus comprising:

a first member capable of being fastened to the trailer, the first member having a first end and a second end;

a first wheel stop bar connected substantially perpendicular to the first member between the first and second ends of the first member;

a second wheel stop bar connected substantially perpendicular to the first member between the first and second ends of the first member;

a first lift bar having a first arm and a first finger, the first arm having a first end and a second end, wherein the first end of the first arm is pivotally connected to the first end of the first member and wherein the second end of the first arm is connected to the first finger;

a second lift bar having a second arm and a second finger, the second arm having a first end and a second end, wherein the first end of the second arm is pivotally connected to the second end of the first member and wherein the second end of the second arm is connected to the second finger;

first securing means connected to the first finger of the first lift bar and connected to the first wheel stop bar for securing a first wheel of the vehicle to the trailer, wherein the first arm prevents lateral movement of the vehicle in a first direction; and second securing means connected to the second finger of the second lift bar and connected to the second wheel stop bar for securing a second wheel of the vehicle to the trailer, wherein the second arm prevents lateral movement of the vehicle in a second direction, opposite of the first direction.

11. The apparatus of claim 10 and further comprising:

locking means for locking the first securing means to the first finger of the lift bar and for locking the securing means to the first wheel stop bar.

12. An apparatus for securing a vehicle to a trailer, the apparatus comprising:

a cylindrical sleeve member capable of being fastened to the trailer;

a first wheel stop bar connected substantially perpendicular to the cylindrical sleeve member;

a lift bar having a body, a first arm, a first finger, a second arm and a second finger, the body positioned substantially within the cylindrical sleeve member for rotational movement about an axis within the cylindrical sleeve member;

first securing means connected to the first finger of the lift bar and connected to the wheel stop bar for securing a first wheel of the vehicle to the trailer, wherein the first arm prevents lateral movement of the vehicle in a first direction; and second securing means connected to the second finger of the lift bar and connected to the wheel stop bar for securing the first wheel o the vehicle to the trailer, wherein the second arm prevents lateral movement of the vehicle in a second direction, opposite of the first direction.

13. An apparatus for securing a vehicle to a trailer, the apparatus comprising:

a first member capable of being fastened to the trailer, the first member having a first end and a second end;

a wheel stop bar connected substantially perpendicular to the first member between the first and second ends of the first member;

a first lift bar having a first arm and a first finger, the first arm having a first end and a second end, wherein the first end of the first arm is pivotally connected to the first end of the first member and wherein the second end of the first arm is connected to the first finger;

a second lift bar having a second arm and a second finger, the second arm having a first end and a second end, wherein the first end of the second arm is pivotally connected to the second end of the first member and wherein the second end of the second arm is connected to the second finger;

first securing means connected to the first finger of the first lift bar and connected to the first wheel stop bar for securing a first wheel of the vehicle to the trailer, wherein the first arm prevents lateral movement of the vehicle in a first direction; and second securing means connected to the second finger of the second lift bar and connected to the wheel stop bar for securing the wheel of the vehicle to the trailer, wherein the second arm prevents lateral movement of the vehicle in a second direction, opposite of the first direction.

* * * * *

UNITED STATES PATENT AND TRADEMARK OFFICE
CERTIFICATE OF CORRECTION

PATENT NO. : 5,593,260

DATED : JANUARY 14, 1997

INVENTOR(S) : CASEY ZIMMERMAN

It is certified that error appears in the above-indentified patent and that said Letters Patent is hereby corrected as shown below:

On the Title Page [57] in the Abstract, line 12, after "A", delete "first" insert --second--

Col. 3, line 42, delete "rigid", insert --rigidly--

Signed and Sealed this

Thirteenth Day of May, 1997

Attest:

BRUCE LEHMAN

Attesting Officer      Commissioner of Patents and Trademarks